Feb. 5, 1929.
J. B. WINTERCORN
UNIVERSAL JOINT
Original Filed April 24, 1926    2 Sheets-Sheet 1
1,700,991
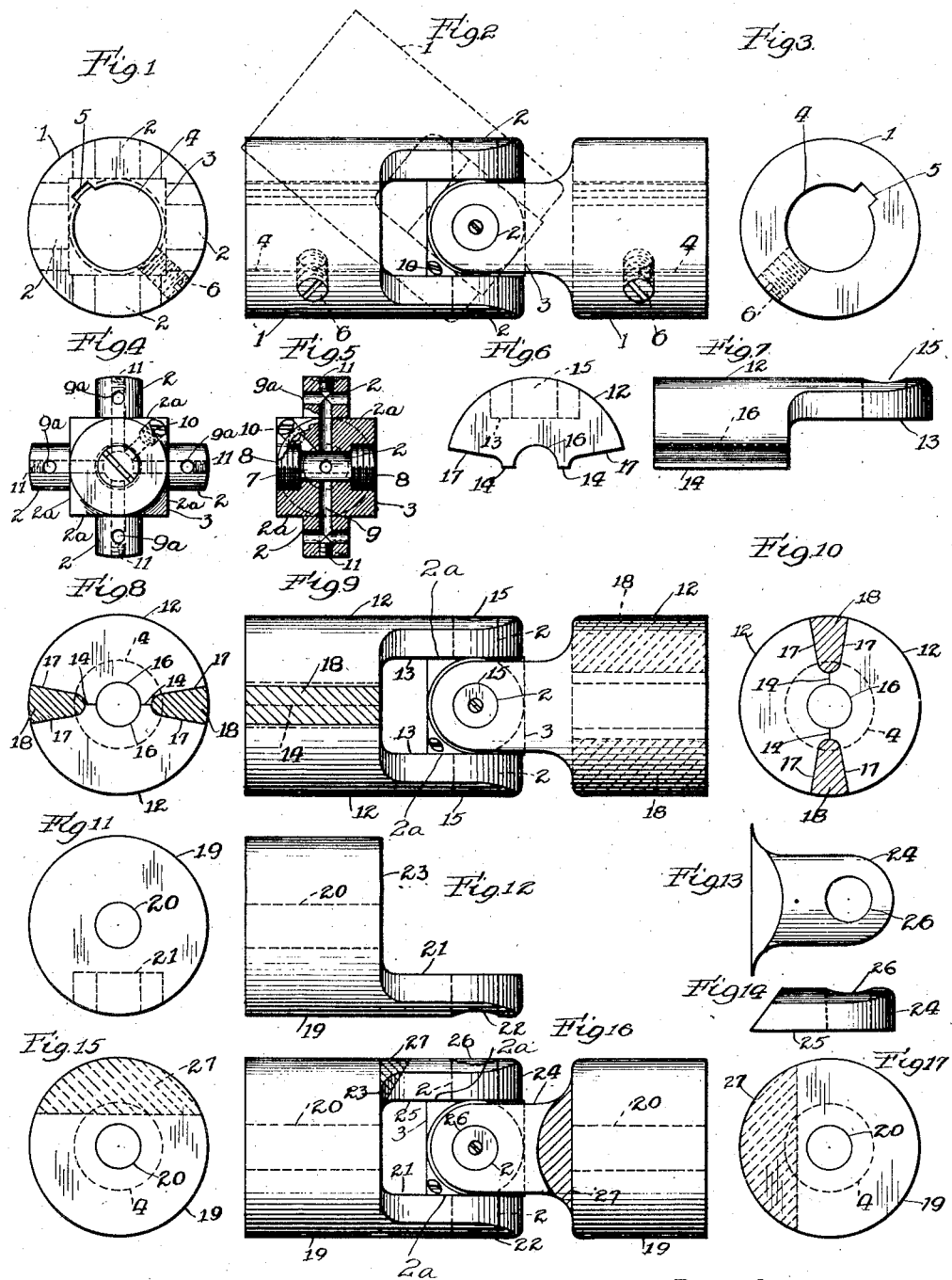
Inventor
John B. Wintercorn Feb. 5, 1929.

J. B. WINTERCORN

UNIVERSAL JOINT

Original Filed April 24, 1926   2 Sheets-Sheet 2

1,700,991

Patented Feb. 5, 1929.

1,700,991

UNITED STATES PATENT OFFICE.

JOHN B. WINTERCORN, OF CHICAGO, ILLINOIS.

UNIVERSAL JOINT.

Application filed April 24, 1926, Serial No. 104,351. Renewed June 30, 1928.

This invention relates to novel means of construction, and of assembly, of the three essential parts of universal joints, namely, the two yoke parts, and one trunnion part, whereby these parts are made of maximum strength, and of a minimum number of pieces. By means of the methods of construction, and of assembly, which will be described herein, each of the two yoke parts are composed of one piece each of metal after assembly, as likewise is the trunnion part composed of one piece of metal. Thus, with my invention, may be obtained a three piece universal joint, which is the principal object, maximum strength of each of the three parts, of course being corollary to a minimum number of pieces to a universal joint. Also particular emphasis is placed upon the fact that the universal joints, in which the herein described means of construction and of assembly are employed, have all wearing surfaces, namely the trunnions of the trunnion part, and the trunnion bearings of the yoke parts, accurately machined, and with ample provision for lubrication.

It is of course known, from the conditions of operation of universal joints, which need not be described here, that three pieces of metal constituting the essential parts, two yoke parts and one trunnion part, are the very minimum number of pieces, which could be assembled to function as a universal joint.

The trend of design was toward single pieces for each of the three essential parts, two yoke parts and one trunnion part, of all types of universal joints, but due to the impossibilities encountered in assembling, when the yoke parts each were made of one piece, the trunnion part necessarily had to be made of more than one piece, or vice versa, when the trunnion part was made of one piece, then for the same reason of impossibility of assembling, the yokes necessarily had to be made of more than one piece each. With my new and improved methods of construction, and of assembly, these difficulties are entirely absent.

Furthermore with my new and improved methods of construction, and of assembly, all types of universal joints, having as the essential parts of their mechanism—two yoke parts and one trunnion part, can be made of three pieces of metal, and can be used in whatever service universal joints can be employed, and will have the maximum of strength of which the metal they are made of is capable of imparting, and having ample lubrication because of the construction permitting this, will have a longer life, and consequently will give greater satisfaction than any previously developed universal joints.

The details of my invention will be made clear by referring to the following drawings:

Fig. 1 is an end elevation of an assembled universal joint, completely machined, and as seen in Fig. 2.

Fig. 2 is a side elevation of an assembled universal joint, completely machined, and of a commonly used type, but illustrating the application of my invention.

Fig. 3 is an end elevation of an assembled universal joint, completely machined, and as seen in Fig. 2.

Fig. 4 is a side elevation of a completely machined trunnion part.

Fig. 5 is an end elevation and part section (vertical) of the trunnion part shown in Fig. 4.

Fig. 6 is an end elevation of a half yoke sleeve and half yoke combined in one piece, and as seen in Fig. 7.

Fig. 7 is a side elevation of a half yoke sleeve and half yoke combined in one piece, partially machined in preparation for the welding operation.

Fig. 8 is an end elevation of an assembled and partially machined universal joint after the welding operation, and as seen in Fig. 9.

Fig. 9 is a side elevation of an assembled and partially machined universal joint after the welding operation, and in accordance with assembly method No. 1.

Fig. 10 is an end elevation of an assembled and partially machined universal joint after the welding operation, and as seen in Fig. 9.

Fig. 11 is an end elevation of a yoke sleeve and a half yoke combined in one piece, and as seen in Fig. 12.

Fig. 12 is a side elevation of a yoke sleeve and a half yoke combined in one piece, partially machined in preparation for the welding operation.

Fig. 13 is a plan view of a half yoke, partially machined in preparation for the welding operation.

Fig. 14 is a side elevation of a half yoke, and as seen in Fig. 13.

Fig. 15 is an end elevation of an assembled and partially machined universal joint after the welding operation, and as seen in Fig. 16.

Fig. 16 is a side elevation of an assembled and partially machined universal joint after the welding operation, and in accordance with assembly method No. 2.

Fig. 17 is an end elevation of an assembled and partially machined universal joint after the welding operation, and as seen in Fig. 16.

Fig. 18 is an end elevation of a yoke sleeve, and as seen in Fig. 19.

Fig. 19 is a side elevation of a yoke sleeve, partially machined in preparation for the welding operation.

Fig. 20 is an end elevation of a half yoke with sleeve attachment combined in one piece, and as seen in Fig. 21.

Fig. 21 is a side elevation of a half yoke with sleeve attachment combined in one piece, partially machined in preparation for the welding operation.

Fig. 22 is an end elevation of an assembled and partially machined universal joint after the welding operation, and as seen in Fig. 23.

Fig. 23 is a side elevation of an assembled and partially machined universal joint after the welding operation, and in accordance with assembly method No. 4.

Fig. 24 is an end elevation of an assembled and partially machined universal joint after the welding operation, and as seen in Fig. 23.

Fig. 25 is a fragmentary side elevation and part section of a yoke part and a trunnion part as assembled, and showing a modification of the construction shown in Fig. 27.

Fig. 26 is an end elevation of an assembled and partially machined universal joint after the welding operation, and as seen in Fig. 27.

Fig. 27 is a side elevation of an assembled and partially machined universal joint after the welding operation, and in accordance with combination assembly method No. 7.

Fig. 28 is an end elevation of an assembled and partially machined universal joint after the welding operation, and as seen in Fig. 29.

Fig. 29 is a side elevation of an assembled and partially machined universal joint after the welding operation, and in accordance with assembly method No. 3.

Fig. 30 is an end elevation of an assembled and partially machined universal joint after the welding operation, and as seen in Fig. 29.

Figs. 1–2–3 show an assembled universal joint, of a commonly used type, with the three parts, two yokes and one trunnion, each of which is composed of one piece of metal, which constitutes the basis of my principal claims to invention. The two yoke parts are shown as 1. The trunnion part 3, is shown with four trunnions 2, which are made integral with trunnion part 3. The dotted outline of yoke part 1, Fig. 2, indicates the extent of the usual operative angular displacement of the yokes 1 about trunnions 2, both above and below the horizontal axis in the drawing, and as is usual also in previously developed universal joints.

The bores 4, the keyways 5, tapped holes for screws 6, and finishing outside surfaces of yokes 1 concentric with bores 4, are machined in the ordinary way, and for the usual purpose, and need not be described here.

There are ten methods of assembly, which also embrace different details of construction of the pieces which are employed in assembling the yoke parts. The trunnion part is made in one piece, and will be described first, as the various assembly methods have to do with the welding together of the detail pieces of the yokes, into one piece, and with the trunnion part in place.

Figs. 4–5 show the completely machined trunning part 3, with trunnions 2, integral with trunnion part 3. One such piece is required for one assembly of a universal joint. Ample provision for lubrication of trunnions 2 is indicated. The body of trunnion part 3 is cubical in shape, with the four trunnions 2 each at right angles to their respective surface $2^a$ of the cube. Opposite trunnions 2 have a common axis, passing through the center of the cube. Thus there are two axes which intersect each other at the center of the cube, and are at right angles to each other. In larger size universal joints a cross shape instead of a cubical one may be used for the body of trunnion part 3, as may be seen in trunnion part 3' of Figs. 26–27. There is a reservoir for lubricant at 7, formed between screw plugs 8, which may be filled with either oil or grease, for feeding lubricant to trunnions 2, by means of oil holes 9 and $9^a$. Screw plug 10 may easily be removed to supply new lubricant as required. The small screw plugs 11 are provided to permit no loss of lubricant. The trunnion part 3 may be made of any suitable material, but should preferably be made of tool steel, hardened after machining, or an alloy steel forging, hardened after machining, the trunnions 2 may be ground to size after hardening, if desired, to remove any possible distortion that may have occurred in the hardening.

*Assembly method No. 1.*

Figs. 6–7 show half yoke sleeve and half yoke 12, before before assembly. Four such pieces are required for one complete universal joint. The surfaces 13 and 14 are machined accurately to requirements. The trunnion bearing 15 is machined to a turning fit for trunnions 2, of trunnion part 3, (Figs. 4–5). Thus when two halves 12 are assembled with trunnion part 3, the trunnion bearing 15 in each case slipping over trunnions 2, the surfaces 14 of the one half 12, will be in contact with the surfaces 14 of the other half 12. The two surfaces 13 of the two halves 12, will be slightly free from the surfaces $2^a$ of trunnion part 3, being separated by means of removable thin shims (not shown) of suitable material, to allow for lubrication and easy turning of trunnion 3 between surfaces 13. These removable thin shims are taken out after the welding operation has been completed. Half bore 16 is forged or cast, and is smaller in diameter than bores 4 (Figs. 1-2-3). The surface 17 is depressed away from 14, in order to provide space for the weld metal, the application of which is later described. The half yoke sleeve and half yoke 12 may be made of any suitable metal, and may be forged or cast, but should preferably be an alloy steel forging not hardened.

Figs. 8-9-10 show the assembled half yoke sleeve and half yoke 12, with trunnion part 3. The shaded areas 18 indicate the weld metal between surfaces 17 of half yoke sleeve and half yoke 12. With the surfaces 14 tightly clamped together, the welding together of halves 12, by the electric arc welding, or the oxy-acetylene process, is readily accomplished. Electric arc welding is considered by me the preferable method. In the case of small size universal joints, soldering, or brazing, may take the place of the above mentioned welding processes, and with surfaces 17 suitably prepared.

By machining accurately in any suitable manner, the bore 16 may be enlarged to the size required, as bore 4 shown dotted, which is the same as that shown in Figs. 1-2-3. Other operations such as cutting keyway 5, tapping for screws 6, and turning the outside surfaces of yokes true with bore 4, will complete the universal joint as shown in Figs. 1-2-3.

Assembly method No. 2.

Figs. 11-12 show yoke sleeve and half yoke 19 combined. Two such pieces are required for one complete universal joint. The bore 20 may be drilled, forged, or cored if cast, and is smaller in diameter than bores 4 (Figs. 1-2-3). The surfaces 21 and 23 are accurately machined to requirements. The trunnion bearing 22 is machined to a turning fit for trunnions 2 of trunnion part 3 (Figs. 4-5). Yoke sleeve and half yoke 19 may be made of any suitable metal, and may be forged or cast, but should preferably be an alloy steel forging not hardened.

Figs. 13-14 show half yoke 24. Two such pieces are required for one complete universal joint. Surface 25 is accurately machined to requirements. The trunnion bearing 26 is machined to a turning fit for trunnions 2 of trunnion part 3. Half yoke 24 may be made of any suitable metal, and may be forged or cast, but should preferably be an alloy steel forging not hardened.

Figs. 15-16-17 show yoke sleeve and half yoke 19, and half yoke 24, assembled with trunnion part 3. Yoke sleeve and half yoke 19, and half yoke 24, are clamped onto trunnion part 3, but with surface 21 of 19, and surface 25 of 24, separated from surface $2^a$ of trunnion part 3, by means of removable thin shims (not shown) of suitable material, to allow for lubrication and easy turning of trunnion part 3 between surfaces 21 and 25. These removable thin shims are taken out after the welding operation has been completed. The shaded areas 27 indicate the weld metal between 19 and 24. The welding together of 19 and 24, by the electric arc welding, or the oxy-acetylene process, is readily accomplished. Electric arc welding is considered by me the preferable method. In the case of small size universal joints, soldering, or brazing, may take the place of the above mentioned welding processes, and with 19 and 24 suitably prepared.

By machining accurately in any suitable manner, the universal joint may be completed as shown in Figs. 1-2-3, as before described.

Assembly method No. 3.

Figs. 13-14 show half yoke 24 as before described. Four such pieces are required for one complete universal joint.

Figs. 18-19 show yoke sleeve 28. Two such pieces are required for one complete universal joint. The bore 29 may be drilled, forged, or cored if cast, and is smaller in diameter than bores 4 (Figs. 1-2-3). The surface 34 is accurately machined to requirements. Yoke sleeve 28 may be made of any suitable metal, and may be forged or cast, but should preferably be an alloy steel forging not hardened.

Figs. 28-29-30 show yoke sleeve 28, and half yoke 24, assembled with trunnion part 3. Four half yokes 24, are clamped onto trunnion part 3, but with surface 25 of half yoke 24, separated from surface $2^a$ of trunnion part 3, by means of removable thin shims (not shown) of suitable material, to allow for lubrication and easy turning of trunnion part 3 between surfaces 25. These removable thin shims are taken out after the welding operation has been completed. The shaded areas 27 indicate the weld metal between half yoke 24, and yoke sleeve 28. Sleeve 28 is held against half yokes 24 in a suitable welding fixture, and are welded together by the electric arc welding, or the oxy-acetylene welding processes. Electric arc welding is considered by me the preferable method. In the case of small size universal joints, soldering, or brazing, may take the place of the above mentioned welding processes, and with 24 and 28 suitably prepared.

By machining accurately in any suitable manner, the universal joint may be completed as shown in Figs. 1-2-3, as before described.

Assembly method No. 4.

Figs. 18-19 show yoke sleeve 28 as before described. Two such pieces are required for one complete universal joint.

Figs. 20–21 show half yoke with sleeve attachment 30. Four such pieces are required for one complete universal joint. Half bore 33 is forged or cast, and is smaller in diameter than bores 4 (Figs. 1–2–3). Surfaces 31, 32, 35, are accurately machined to requirements. The trunnion bearing 30$^a$ is machined to a turning fit for trunnions 2 of trunnion part 3. Half yoke with sleeve attachment 30 may be made of any suitable metal, and may be forged or cast, but should preferably be an alloy steel forging not hardened.

Figs. 22–23–24 show the assembled yoke sleeve 28, and half yoke with sleeve attachment 30, with trunnion part 3. Surfaces 32 of piece 30, are clamped tightly together. Surfaces 31 of piece 30 are slightly separated from surfaces 2$^a$ of trunnion part 3, by means of thin removable shims (not shown), of suitable material, to allow for lubrication and easy turning of trunnion part 3 between surfaces 31. These removable thin shims are taken out after the welding operation has been completed. Surface 34 of piece 28, and surfaces 35 of pieces 30, are brought together with considerable pressure in an electric butt-welding machine, and are firmly welded together. The welts 36 indicate fused, or softened metal, forced out, or "mushroomed", by the pressure exerted by the electric butt-welding machine, from the surfaces 34 and 35, of pieces 28 and 30, respectively.

By machining accurately in any suitable manner, the universal joint may be completed as shown in Figs. 1–2–3, as before described.

*Combination assembly methods.*

Figs. 26–27 show a universal joint having trunnion part 3′ similar to trunnion part 3, shown in Figs. 4–5, but with the main body of cross shape instead of cubical, and with oil hole 9$^a$ and screw plug 11 omitted, and with the yokes of a larger outside diameter dimension than in Figs. 1–2–3. It will be observed that the trunnion bearings 42 do not extend all the way through the yokes 41, and that oil holes 9′ are open at the ends of trunnions 2′. The purpose of extending yokes 41 over the outer ends of trunnions 2′, is to prevent entrance of dust etc., into trunnion bearings 42, and also to retain the lubricant in trunnion bearings 42.

Fig. 25 shows a part of a yoke 43, which is similar to yoke 41 of Figs. 26–27, with the exception that trunnion 44 is part of yoke 43. Fig. 25 also shows trunnion part 46, which is unlike that shown as 3′ in Figs. 26–27 in the fact that trunnion bearing 45 is substituted for trunnion 2′. Oil hole 47 is the same as 9′ in Figs. 26–27, and feeds a supply of lubricant from a reservoir to each of the four trunnion bearings 45, as shown. This construction gives the same advantages, such as the prevention of entrance of dust, and the retention of lubricant, as obtained in the construction shown in Figs. 26–27.

It is apparent that the constructions shown in Figs. 26–27, and in Fig. 25, of the trunnion bearing and trunnions, is only possible, because of the means of assembly employed. It would be impossible to assemble a three piece universal joint by any other than the methods of assembly presented in this specification.

Figs. 26–27 also show the possibility of applying any of the previously described methods of assembly, (Nos. 1, 2, 3, 4) equally as well to this, or for that matter, any other type of universal joint. Shaded area 37 indicates the weld metal applied in the same manner as in assembly method No. 1, and shown in Figs. 8–9–10. Welt 39 indicates the fused or softened metal forced out by the pressure exerted by the electric butt-welding machine, from surface 40, and in the same manner as in assembly method No. 4, and shown in Figs. 22–23–24. The Figs. 26–27 are likewise an illustration of combination assembly method No. 7, which is later described. Of course assembly methods No. 2 and No. 3 could also have been applied in the place of assembly methods No. 1 and No. 4, and either alone or in combination, but the ones chosen serve equally as well to show the application of my invention.

It is possible to apply the assembly methods Nos. 1, 2, 3, 4, in a number of combinations as the six now to be given, as follows:

*Combination assembly method No. 5.*

Assembly method No. 1 applied on one yoke, and assembly method No. 2, applied to the second yoke, with trunnion part 3 in place.

*Combination assembly method No. 6.*

Assembly method No. 1 applied on one yoke, and assembly method No. 3 applied to the second yoke, with trunnion part 3 in place.

*Combination assembly method No. 7.*

Assembly method No. 1 applied on one yoke, and assembly method No. 4 applied to the second yoke, with trunnion part 3 in place.

*Combination assembly method No. 8.*

Assembly method No. 2 applied on one yoke, and assembly method No. 3 applied on the second yoke, with trunnion part 3 in place.

*Combination assembly method No. 9.*

Assembly method No. 2 applied on one yoke, and assembly method No. 4 applied to the second yoke, with trunnion part 3 in place.

*Combination assembly method No. 10.*

Assembly method No. 3 applied to one yoke, and assembly method No. 4 applied to the second yoke, with trunnion part 3 in place.

With the assembly methods given, and where welding is carried on continuously without an interval of time intervening to permit cooling the parts by radiation of the heat into the surrounding air, the flow of heat from the weld through the yoke part into the trunnion part may become excessive, thereby causing the annealing of the heat treated trunnion part and also the distortion of the trunnions of the trunnion part and the yokes of the yoke part. Therefore an artificial cooling means of some kind must be provided, and may consist of several different types depending upon the nature of the welding apparatus and the mode of welding employed, i. e., whether electric arc, electric butt, or oxy-acetylene, as follows:

A. Immersion of all metal in either water or oil with the exception of the actual area being welded.

B. Covering the parts completely with wet clay or wet asbestos with the exception of the actual area being welded.

C. Applying a stream of water or oil to the parts as close to the area being welded as practicable.

I claim:

1. The method of making universal joints consisting in forming two yoke parts each in a plurality of pieces, forming an integral interconnecting part, assembling the pieces composing each of the yoke parts with the interconnecting part, in proper relation to each other, and welding together the pieces composing each of the yoke parts to form two integral yoke parts, whereby a universal joint consisting of three integral parts is formed.

2. The method of making universal joints consisting in forming two yoke parts each in a plurality of pieces, forming an integral interconnecting part provided with four bearing portions, the latter part being machined on the cylindrical surface and the adjacent flat surface at right angles thereto of each of the four bearing portions so that opposite portions have a common axis passing through the center of the body of the interconnecting part and the two common axes of the two pairs of portions are at right angles to each other and intersect at the center of the body of the interconnecting part, assembling the pieces composing each of the yoke parts with the interconnecting part in proper relation to each other, and welding together the pieces composing each of the yoke parts to form two integral yoke parts, whereby a universal joint consisting of three integral parts is formed.

3. The method of making universal joints consisting in forming two yoke parts each in a plurality of pieces, forming an integral interconnecting part machined to provide four bearing portions and having a reservoir to contain lubricant formed in the body thereof and having holes connecting the said reservoir with the surface of each of the four bearing portions thereof to provide for the lubrication of the said portions, assembling the pieces composing each of the yoke parts with the interconnecting part in proper relation to each other, and welding together the pieces composing each of the yoke parts to form two integral yoke parts, whereby a universal joint consisting of three integral parts is formed.

4. The method of making universal joints consisting in forming two yoke parts each in a plurality of pieces, forming an integral interconnecting part machined to provide four bearing portions and heat treating the latter part to secure greater strength and wearing qualities in the four bearing portions thereof, assembling the pieces composing each of the yoke parts with the interconnecting part in proper relation to each other, and welding together the pieces composing each of the yoke parts to form two integral yoke parts, whereby a universal joint consisting of three integral parts is formed.

5. The method of making universal joints consisting in forming two yoke parts each in a plurality of pieces, forming an integral interconnecting part machined to provide four bearing portions and heat treated as described and grinding the cylindrical surface and the adjacent flat surface at right angles thereto of each of the four bearing portions to remove any possible distortion that may have occurred due to heat treating and to secure greater accuracy in the diameter of the portions and also in the angular relationship between each of the four portions to the other three, assembling the pieces composing each of the yoke parts with the interconnecting part in proper relation to each other, and welding together the pieces composing each of the yoke parts to form two integral yoke parts, whereby a universal joint consisting of three integral parts is formed.

6. The method of making universal joints consisting in forming two yoke parts each in a plurality of pieces and each of two of the said plurality of pieces of each yoke part having a cylindrical hole machined to a turning fit for a trunnion of the trunnion part and having the flat surface adjacent to the cylindrical hole and at right angles thereto which abuts on the flat surface adjacent to the cylindrical surface of the said trunnion machined and for the purpose of forming a bearing for each of the four trunnions of the trunnion part, forming an integral trunnion part as described, assembling the pieces composing each of the yoke parts with the trunnion part in proper relation to each other, and welding together the pieces composing each of the yoke parts to form two integral yoke parts, whereby a universal joint consisting of three integral parts is formed.

7. The method of making universal joints consisting in forming two yoke parts each in a plurality of pieces and each of two of the said plurality of pieces of each yoke part being machined to form bearings for the four trunnions of the trunnion part and likewise being machined on abutting surfaces adjacent to surfaces which will be welded for the purpose of securing alignment of the said pieces of each of the yoke parts when held in the welding fixture, forming an integral trunnion part as described, assembling the pieces composing each of the yoke parts with the trunnion part in proper relation to each other, and welding together the pieces composing each of the yoke parts to form two integral yoke parts, whereby a universad joint consisting of three integral parts is formed.

8. The method of making universal joints consisting in forming two yoke parts each in a plurality of pieces as described, forming an integral interconnecting part as described, assembling the pieces composing each of the yoke parts with the interconnecting part in proper relation to each other and providing a cooling means to prevent annealing the heat treated interconnecting part and also the distortion of the interconnecting part and the two yoke parts caused by conducted heat during the welding operation, and welding together the pieces composing each of the yoke parts to form two integral yoke parts, whereby a universal joint consisting of three integral parts is formed.

9. The method of making universal joints consisting in forming two yoke parts each in a plurality of pieces as described, forming an integral interconnecting part provided with four bearing portions, assembling the pieces composing each of the yoke parts with the interconnecting part in proper relation to each other, welding together the pieces composing each of the yoke parts to form two integral yoke parts and machining the bore of each of the two yoke parts so that the axis of the bore is at right angles to the plane containing the axes of the four bearing portions and passes through the point of intersection of the axes and securing means of attaching driving and driven shafts to the two yoke parts, whereby a universal joint consisting of three integral parts is formed.

10. The method of making universal joints consisting in forming two yoke parts each in a plurality of pieces as described, forming an integral interconnecting part provided with four bearing portions, assembling the pieces composing each of the yoke parts with the interconnecting part in proper relation to each other, welding together the pieces composing each of the yoke parts to form two integral yoke parts and machining the outside diameter of each of the axially extended yoke parts so that the axis of the extension is at right angles to the plane containing the axes of the four bearing portions and passes through the point of intersection of the axes and forming driving and driven shafts of the two yoke parts, whereby a universal joint consisting of three integral parts is formed.

11. The method of making pivotal joints consisting in forming a yoke part in a plurality of pieces, forming an integral trunnion part, assembling the pieces composing the yoke part with the trunnion part in proper relation to each other, and welding together the pieces composing the yoke part to form an integral yoke part, whereby a pivotal joint consisting of two integral parts is formed.

12. The method of making pivotal joints consisting in forming a yoke part in a plurality of pieces, forming an integral connecting part provided with opposite bearing portions, machining the cylindrical surface and the adjacent flat surface at right angles thereto of each of the two bearing portions so that the two portions are opposite one another and have a common axis passing through the center of the body of the connecting part, assembling the pieces composing the yoke part with the connecting part in proper relation to each other, and welding together the pieces composing the yoke part to form an integral yoke part, whereby a pivotal joint consisting of two integral parts is formed.

13. The method of making pivotal joints consisting in forming a yoke part in a plurality of pieces, forming an integral connecting part machined to provide opposite cylindrical bearing portions and having a reservoir to contain lubricant formed in the body thereof and having holes connecting the same reservoir with the cylindrical surface of each of the two portions to provide for the lubrication of the said portions, assembling the pieces composing the yoke part with the connecting part in proper relation to each other, and welding together the pieces composing the yoke part to form an integral yoke part, whereby a pivotal joint consisting of two integral parts is formed.

14. The method of making pivotal joints consisting in forming a yoke part in a plurality of pieces, forming an integral connecting part machined as described to provide opposite bearing portions and heat treating the latter part to secure greater strength and wearing qualities in the two bearing portions thereof, assembling the pieces composing the yoke part with the connecting part in proper relation to each other, and welding together the pieces composing the yoke part to form an integral yoke part, whereby a pivotal joint consisting of two integral parts is formed.

15. The method of making pivotal joints consisting in forming a yoke part in a plurality of pieces, forming an integral connecting part machined to provide opposite cylindrical bearing portions and heat treated as described and grinding the cylindrical surface and the adjacent flat surface at right angles thereto of each of the two bearing portions to remove any possible distortion that may have occurred due to heat treating and to secure greater accuracy in the diameter of the bearing portions and also assure their having a common axis passing through the center of the body of the connecting part, assembling the pieces composing the yoke part with the connecting part in proper relation to each other, and welding together the pieces composing the yoke part to form an integral yoke part, whereby a pivotal joint consisting of two integral parts is formed.

16. The method of making pivotal joints consisting in forming a yoke part in a plurality of pieces and each of two of the said plurality of pieces having a cylindrical hole machined to a turning fit for a trunnion of the trunnion part and having the flat surface adjacent to the cylindrical hole and at right angles thereto which abuts on the flat surface adjacent to the cylindrical surface of the said trunnion machined and for the purpose of forming a bearing for each of the two trunnions of the trunnion part, forming an integral trunnion part as described, assembling the pieces composing the yoke part with the trunnion part in proper relation to each other, and welding together the pieces composing the yoke part to form an integral yoke part, whereby a pivotal joint consisting of the two integral parts is formed.

17. The method of making pivotal joints consisting in forming a yoke part in a plurality of pieces and each of two of the said plurality of pieces being machined to form bearings for the two trunnions of the trunnion part and also being machined on abutting surfaces adjacent to surfaces which will be welded for the purpose of securing alignment of the said pieces of the yoke part when held in the welding fixture, forming an integral trunnion part as described, assembling the pieces composing the yoke part with the trunnion part in proper relation to each other, and welding together the pieces composing the yoke part to form an integral yoke part, whereby a pivotal joint consisting of two integral parts is formed.

18. The method of making pivotal joints consisting in forming a yoke part in a plurality of pieces as described, forming an integral connecting part as described, assembling the pieces composing the yoke part with the connecting part in proper relation to each other and providing a cooling means to prevent annealing the heat treated connecting part and also the distortion of the connecting part and the yoke part caused by conducted heat during the welding operation, and welding together the pieces composing the yoke part to form an integral yoke part, whereby a pivotal joint consisting of two integral parts is formed.

19. The method of making pivotal joints consisting in forming an integral connecting part, forming a yoke part in a plurality of pieces, assembling the pieces composing the yoke part with the connecting part in proper relation therewith, and welding together the pieces composing the yoke part to operatively unite the yoke part and the connecting part.

20. The method of making pivotal joints consisting in forming an integral connecting part, forming a yoke part in a plurality of pieces each provided with a surface adapted to be united with a corresponding surface on another piece, providing a recess in one of a pair of corresponding surfaces to provide a maximum of fusing area therebetween and at the same time leave a contacting portion on said surface to permit clamping of the pieces together without distorting their relative positions, assembling the pieces composing the yoke part with the connecting part in proper relation therewith, and filling the space which has been provided with weld metal to operatively unite the yoke part with connecting part.

21. The method of making pivotal joints consisting in forming an integral connecting part, forming a yoke part in a plurality of pieces provided with a pair of surfaces adapted to be united, providing one of said surfaces with space to be filled with fused metal, assembling the pieces composing the yoke part with the connecting part in proper relation therewith, and filling the space which has been provided with weld metal to integrally unite the pieces.

22. The method of making universal joints consisting in forming two yoke parts each in a plurality of pieces, forming an integral interconnecting part, assembling the pieces composing each of the yoke parts with the interconnecting part in proper relation therewith and welding together the pieces composing each of the yoke parts to operatively unite the yoke parts with the interconnecting part.

23. The method of making pivotal joints consisting in forming an integral connecting part, forming a yoke part in two pieces, assembling the pieces composing the yoke part with the connecting part in proper relation therewith, and welding together the pieces composing the yoke part to operatively unite the yoke part with the connecting part.

24. The method of making pivotal joints consisting in forming an integral connecting part, forming a yoke part in a plurality of pieces and machining abutting surfaces of the said pieces of the yoke part for the purpose of securing alignment of the pieces during the welding operation, assembling the pieces composing the yoke part with the connecting part in proper relation therewith, and welding together the pieces composing the yoke part to operatively unite the yoke part with the connecting part.

25. The method of making pivotal joints consisting in forming an integral connecting part, forming a yoke part in a plurality of pieces, machining abutting surfaces of said pieces and providing a recess at said abutting surfaces of the said pieces of the yoke part for the purpose of providing space to be filled with fused metal during the welding operation and thus integrally uniting the pieces of the yoke part, assembling the pieces composing the yoke part with the connecting part in proper relation therewith, and welding together the pieces composing the yoke part to operatively unite the yoke part with the connecting part.

In testimony whereof, I have hereunto affixed my signature.

JOHN B. WINTERCORN.